July 28, 1959     A. C. DE ANGELIS ET AL     2,896,867
GRINDING MILL

Filed March 11, 1957     2 Sheets-Sheet 1

INVENTORS
ANGELO C. DE ANGELIS
HARRY E. BUTTERFIELD JR.

BY

ATTORNEY

July 28, 1959     A. C. DE ANGELIS ET AL     2,896,867

GRINDING MILL

Filed March 11, 1957     2 Sheets-Sheet 2

INVENTORS
ANGELO C. DE ANGELIS
HARRY E. BUTTERFIELD JR.

BY

ATTORNEY

United States Patent Office 2,896,867
Patented July 28, 1959

2,896,867

GRINDING MILL

Angelo C. De Angelis, New Shrewsbury, and Harry E. Butterfield, Jr., Maplewood, N.J., assignors, by mesne assignments, to Dynamics Corporation of America, New York, N.Y., a corporation of New York Application March 11, 1957, Serial No. 645,105

6 Claims. (Cl. 241—259)

This invention relates to improvements in grinding mills such as for grinding coffee.

A principal object of the invention is to provide a coffee mill attachment for household blenders, such as devices known as Waring Blendors, which is adapted to be mounted upon the blender base in place of the usual blender container and operated by the usual blender electric motor.

Another object of the invention is to provide a coffee mill which is capable of adjustment for selectively varying the degree of grind and wherein the adjusting mechanism is housed within the body of the device and protected against accidental displacement.

Still another object of the invention is to provide a blender coffee mill attachment which is extremely simple in construction and durable and efficient in operation.

Other objects and advantages of the invention will be apparent from the following detailed description taken in conjunction with the accompanying drawings.

Referring more particularly to the drawings, wherein like numerals refer to like parts, the device as shown consists essentially of a jar 10 having a threaded mouth 12 and a base 14 housing the grinder mechanism assembly upon which the jar 10 is supported in inverted position.

Figure 1:
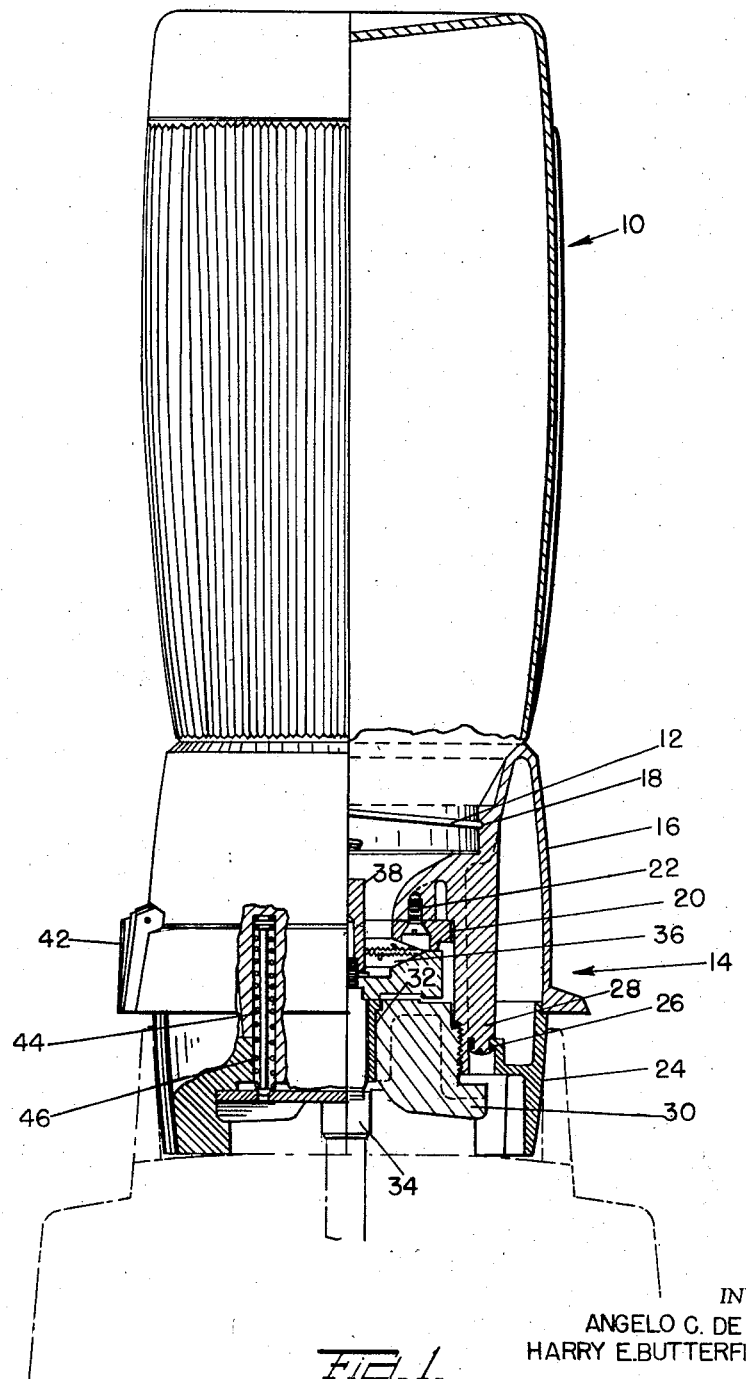
Fig. 1 is an elevational view in half longitudinal section and partly broken away of a coffee mill attachment constructed in accordance with the present invention and shown mounted in operative position upon the base of a blender such as that disclosed in Patent No. 2,761,659.
Figure 2:
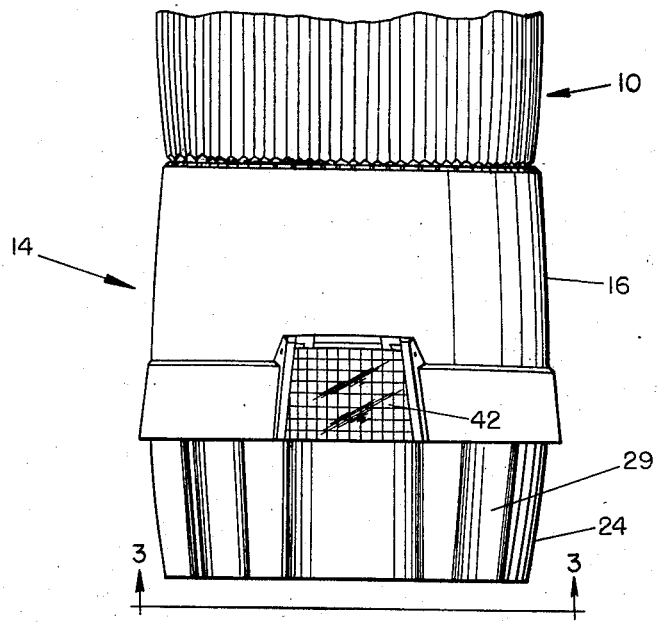
Fig. 2 is a front perspective view of the coffee mill shown in Fig. 1 with the jar portion thereof broken away.

The base portion 14 is composed of an upper housing member 16 having a threaded mouth 18 for receiving the mouth of the jar 10 and a tapering central recessed portion terminating in a central opening around the periphery of which the annular upper cutter element 20 is fixed to the housing by a plurality of countersunk screws 22 as shown in Fig. 1. The lower housing 24 is provided with a plurality of radially disposed socket portions 26 for receiving the ends of fingers 28 depending from the upper housing 16, the fingers being adapted to be spun over when the two housing members are assembled so as to be held securely together. For operatively positioning the mill attachment upon the blender base, recessed areas 29 are provided at intervals around the periphery of the lower housing 24 for mating engagement with the upright posts usually carried by such blender bases for supporting the blender container in axial alignment with the motor drive shaft, as indicated by the broken lines in Fig. 1.

Figure 5:
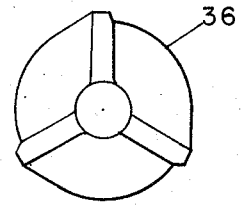
Fig. 5 is a back view of the lower adjustable cutter.

The lower housing 24 is provided with threaded central opening for receiving a cutter adjusting wing nut 30 having a plate 31 and which supports a bearing sleeve 32 for receiving a drive screw 34. The upwardly extended threaded end of the drive screw 34 projects through the axial bore of the lower grinding element 36 which is rotatably secured to the drive screw by a cap nut 38. The back face of the lower cutter or grinding element may be provided with radially extending reinforcing ribs, as shown in Fig. 5, if desired. The depending end of drive screw 34 has a drive socket for driven engagement with the axially aligned electric motor drive shaft which projects upwardly of the blender base.

Figure 3:
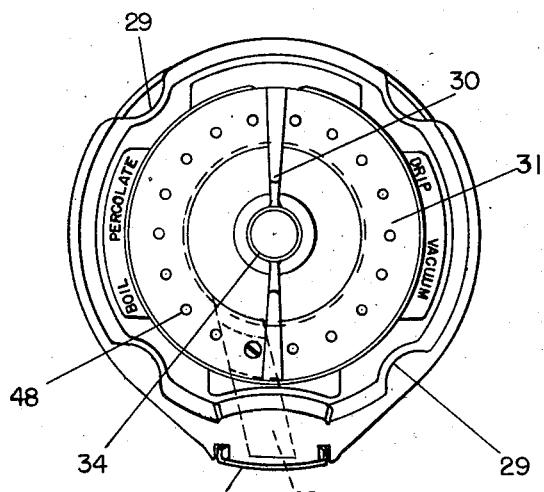
Fig. 3 is a bottom view taken on the line 3—3 of Fig. 2.
Figure 4:
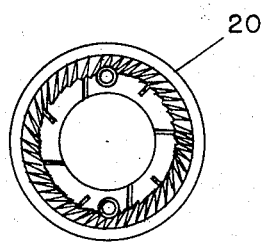
Fig. 4 is a face view of the upper stationary cutter.

It will be apparent that the two grinding elements are in opposed relationship for operating upon coffee or other material fed into the grinding area through the central opening in the upper grinding element 20 and that the ground material is centrifugally discharged from the grinding area through the tangential path 40, as indicated by broken lines in Fig. 3, to the hinged door 42. The door 42 is preferably weighted so as normally to assume the closed position as shown and is capable of being forced open outwardly by the pressure of the ground material within the passage 40 to discharge ground material from the device.

The cutter adjusting wing nut is rotatable to elevate or lower its cutter element 36 relative to the fixed cutter 20 whereby to regulate the fineness of the grind and fixed calibrations disposed radially outwardly of the wing nut determine its setting. Retention means to maintain the cutter adjusting nut fixed in selective position are preferably provided such as the detent pin 44 which is urged downwardly by a spring 46 into engagement with an annular row of recesses 48 provided in the plate 31. As a feature of the invention it will be noted that the cutter adjusting nut is housed within the skirt depending from the bottom of the lower housing 24 so that the adjusting elements are protected from outside contact and against accidental displacement.

It will be understood that the present invention is not confined to the particular construction and arrangement of parts herein described and illustrated but embraces all such modifications thereof as come within the scope of the following claims.

What is claimed is:

1. A grinding mill for attachment to the shaft of an electrically driven blender having retaining means carried by its base for a removable container, the said attachment comprising, a housing, relatively rotatable grinding elements supported axially within said housing, means for feeding material to said grinding elements, the said housing including a depending skirt, means carried by said skirt for engagement with the blender container supporting means for operatively positioning said housing upon the blender base with said grinding elements in axial alignment with the motor drive shaft, said grinding elements being also supported for relative movement axially, and means disposed within said skirt and operable through the bottom of said skirt for relatively moving said grinding elemnets axially whereby to adjust the degree of grind.

2. The device of claim 1 wherein the adjusting means relatively moving the grinding elements is disposed radially outwardly of the motor drive shaft.

3. The device of claim 2 wherein the adjusting means includes indicia to determine the degree of grind and said indicia is disposed within said skirt.

4. A grinding mill for attachment to the shaft of an electrically driven blender having retaining means carried by its base for a removable container, the said attachment comprising, a housing, an upper grinding element fixed within said housing, a lower grinding element rotatably supported within said housing axially of said upper fixed grinding element, a depending skirt for said housing, a drive screw having a lower driven end disposed within said skirt and adapted for driven engagement with the blender drive shaft, the upper end portion of said drive screw being in rotating driving engagement with said lower grinding element, means for feeding material to said grinding elements, the said lower grinding element being also supported for vertical adjustment relative to said upper grinding element whereby to control the degree of grind of material fed to said grinding elements, means disposed within said skirt and accessible from the bottom of the skirt for vertically adjusting said lower grinding element, and means carried by said skirt for engagement with the blender container supporting means for operatively positioning said housing upon the blender base.

5. The device of claim 4 wherein the vertical adjusting means is disposed radially outwardly of said drive screw.

6. The device of claim 4 wherein the vertical adjusting means includes indicia to determine the degree of grind and said indicia is disposed within said skirt.

References Cited in the file of this patent

UNITED STATES PATENTS

| 1,969,899 | Nielson | Aug. 14, 1934 |
| 2,212,883 | Meeker et al. | Aug. 27, 1940 |
| 2,343,757 | Egedal | Mar. 7, 1944 |
| 2,569,156 | Dybvig | Sept. 25, 1951 |
| 2,585,255 | Kochner et al. | Feb. 12, 1952 |
| 2,733,396 | Luther | Jan. 31, 1956 |
| 2,771,111 | Seyfried | Nov. 20, 1956 |

FOREIGN PATENTS

| 722,680 | Great Britain | Jan. 26, 1955 |